Sept. 10, 1968     R. D. PRUESSNER ET AL     3,401,113
WASTE TREATMENT PROCESS
Filed July 11, 1966
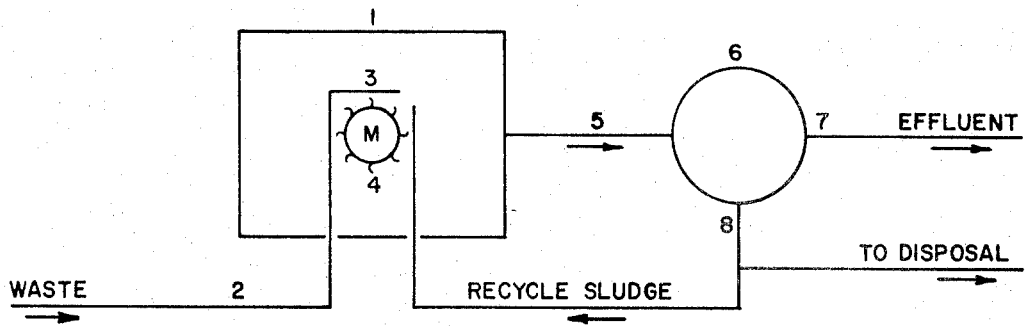
FIG. I
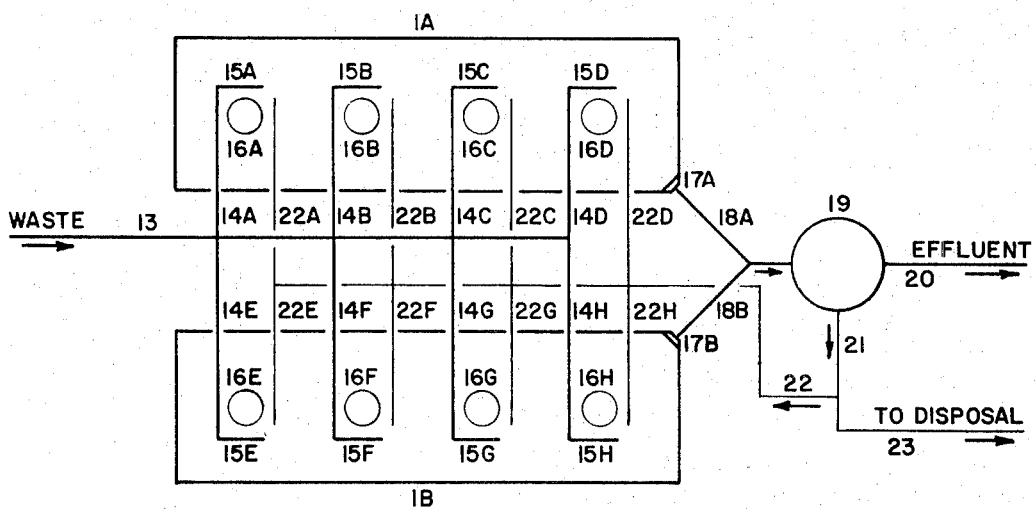
FIG. II
ROBERT D. PRUESSNER
RUDOLPH C. WOERNER
*INVENTORS*
BY Albert J. Adamick
AGENT United States Patent Office 3,401,113
Patented Sept. 10, 1968

3,401,113
WASTE TREATMENT PROCESS
Robert D. Pruessner and Rudolph C. Woerner, Houston, Tex., assignors to Petro-Tex Chemical Corporation, Houston, Tex., a corporation of Delaware
Filed July 11, 1966, Ser. No. 570,681
9 Claims. (Cl. 210—7)

ABSTRACT OF THE DISCLOSURE

Process for aerobic waste decomposition wherein waste and activated sludge are supplied to a zone of aeration and agitation in a ratio of 0.15 to 0.41 lb. BOD per lb. MLVSS.

---

This invention relates to a new and useful process for the purification of wastes and, more particularly, to an efficient and economical method of treating wastes or other liquids containing highly toxic and pollutional materials.

There are several common methods in use today for effecting treatment of waste (the terms "waste" or "wastes," as used hereinafter in this specification and in the claims, are intended to include not only domestic waste, but also industrial waste and/or other liquids containing highly toxic or pollutional material). One method, the trickling filter method, allows the waste to trickle down through a bed of stone whereby the organic material therein is oxidized by the action of biologic slimes on the stone. A second method is the activated sludge process in which the waste is aerated and agitated by compressed air or mechanical means together with an "activated" sludge. Another method of treatment is anaerobic digestion, which is sometimes used to treat very strong wastes and is also used for the digestion of sludge settled out in conventional aerobic processes. In the anaerobic process, the waste is fed into a closed tank which may or may not be heated, depending upon the temperature of the waste delivered to the disposal plant. After the waste has been sufficiently digested and compacted, a portion of it is then flushed or pumped to sand beds or vacuum filters for drainage and final disposal. The process of the present invention is related, in a general way, to the activated sludge process and the latter process will therefore be described more fully.

In the activated sludge process, the waste is often settled first in a clarification tank where the heavier solids settle out, leaving a relatively clear effluent which overflows to an aeration unit or units. The aeration units generally consist of tanks equipped with air diffusers located in the bottom which continuously aerate the liquid in the tanks. Alternatively, the waste may be aerated by mechanical aerators which continuously agitate the waste contained in the aeration tank. The duration of aeration in these tanks is dependent on several factors, including the chemical content and pH of the waste, the temperatures involved, etc. The sludge consists of flocculent solids maintained in suspension and is full of bacterial organisms and other living matter which aid in effecting the oxidation of the material in the waste. In general, the liquid in the aeration tanks, after a suitable retention time, is conveyed to a clarifying or settling zone where it is separated into an effluent water stream and a recycle activated sludge stream. A portion of the recycle activated sludge stream is separated and disposed of in some fashion to prevent build-up of the activated sludge in the system.

Despite the knowledge on hand about the activated sludge process, difficulties in its application quite often arise which are the subject of much concern. For example, where waste contains a high percentage of volatile materials, odor and air pollution may be a problem. Again, if the waste is strongly acidic or basic, additional pH control becomes a necessity. If the system becomes unbalanced by reason of extreme variance in feed or recycle of the activated sludge, problems such as foaming or unusual difficulty in settling are apt to occur.

The object of the invention is, therefore, the provision of an improved process for the treatment of waste. More particularly, it is an object of the invention to provide a process for waste treatment which is effective in treating not only domestic or municipal wastes, but industrial wastes which contain a high percentage of volatile and toxic materials, as well as other pollutional materials. It is a further object of the invention to provide a process of this type wherein foaming, difficulty in settling and the necessity for supplemental pH control are virtually eliminated.

Briefly, the invention may be described as an extended aeration waste treatment procedure wherein the waste enters the treatment unit in such a way as to approach the concept of a completely mixed system. The waste is introduced directly and contiguously to the aeration zone in a specified ratio of waste to activated sludge. This combination of rapid dispersion of the waste with the activated sludge in a specified critical range of proportions substantially eliminates volatilization, foam and difficulty in settling, and the need for additional pH control.

FIGURE I shows schematically a waste disposal process incorporating the improvements of the invention.

FIGURE II shows a modification of the system of FIGURE I wherein a multiplicity of units is utilized to achieve waste treatment on a larger scale.

More particularly, with reference to FIGURE I, numeral 1 indicates a tank or lagoon which provides a contact zone in which waste is contacted with an activated sludge. The preparation of the activated sludge is known in the art, as illustrated in U.S. Patent 2,875,151, and does not form a part of the invention. Waste enters the lagoon or contact zone through line 2 and is dispersed through subsurface header 3 directly and contiguously to a zone of high aeration and agitation around an aerator 3. It is within the scope of the invention to provide a clarifier or settler before the entry of the waste into the contact zone for wastes having high solids content. The aerator employed is preferably of the mechanical surface type which is known in the art, and header 3 is located in such relation to the zone of high aeration and agitation around the aerator so as to provide rapid dilution and cooling of the waste. The input of waste and the volume of the activated sludge in the contact zone is regulated to provide a ratio of from about 0.15 to about 0.41 pound BOD per pound MLVSS (pounds biochemical oxygen demand per pounds mixed liquor volatile suspended solids). The BOD/MLVSS ratios utilized are tested and calculated on a five day basis using acclimatized activated sludge in accordance with the procedures set forth in Standard Methods for the Examination of Water and Wastewater; published by the American Public Health Association, Inc.; eleventh edition, 1960, Qd 142A5, pages 319 to 329. Ratios of from about 0.15 to about 0.41 pound BOD/pound MLVSS have been found to be critical for the successful operation of the process. Retention time in the contact zone depends on a number of factors and will vary from three to six days. The waste is decomposed by the activated sludge, as in known in the art, and forms additional activated sludge. Overflow sludge is taken off through line 5 to clarifier or settler 6. Effluent water of sufficient cleanliness to support fish and other aquatic life is taken off through line 7. Line 8 provides a recycle for activated sludge and an outlet for a portion of the sludge which may be sent to an anaerobic decomposition zone to prevent buildup of activated sludge in the system.

FIGURE II represents a preferred embodiment of the invention. Waste enters two contact lagoons, 1-A and 1-B, through line 13 and distribution lines 14-A, 14-B, 14-C, 14-D, 14-E, 14-F, 14-G and 14-H. As in the embodiment of FIGURE 1, the subsurface headers 15-A, 15-B, 15-C, 15-D, 15-E, 15-F, 15-G and 15-H are located in such relation to the zone of high aeration and agitation around aerators 16-A, 16-B, 16-C, 16-D, 16-E, 16-F, 16-G and 16-H so as to provide rapid dilution and cooling of the waste. Here again it is necessary that the input of waste and the volume of sludge be regulated to provide a ratio of from about 0.15 to about 0.41 pound BOD per pound MLVSS. The waste preferentially flows at as nearly an equal rate as possible from each header, in order to maintain uniform distribution in the system. In one embodiment, this was accomplished by providing sufficient one-inch orifices in each header to create about a two-pound pressure drop across the orifices.

Overflow from the lagoons is taken off through weirs 17-A and 17-B through lines 18-A and 18-B to clarifier or settler 19. Clean effluent water passes out through line 20 while the activated sludge settled in the clarifier is taken off through line 21. From line 21, a portion of the activated sludge may be sent to an anaerobic decomposition zone via line 23 and, as is normally the case, a portion may be recycled through line 22 into distribution lines 22-A, 22-B, 22-C, 22-D, 22-E, 22-F, 22-G and 22-H back into the contact zone.

If desired, and depending upon the type of waste treated, nitrogen and phosphorus may be added to the system to provide healthy sludge growth. Nitrogen may be introduced, for example, in the form of ammonia solutions, nitrate solutions, etc. while both nitrogen and phosphorus may be added as diammonium hydrogen phosphate.

Example I

An industrial waste containing, exclusive of water content, approximately 4.7 parts (all parts by weight) $C_4$ hydrocarbons, 82.6 parts non-acidic carbonyl compounds of 2 to 10 carbon atoms

containing compounds of 2 to 10 carbons, exclusive of those compounds wherein the

group is contained in a carboxyl group), 9.7 parts monobasic and dibasic organic acids, and 2.5 parts of acetylenic and miscellaneous compounds, and having a BOD of 1449 milligrams per liter and a pH of 4.5 was fed continuously into the system of FIGURE I. The $C_4$ hydrocarbons included butene-2 and butadiene, and the principal non-acidic carbonyl compounds present included formaldehyde, acetaldehyde, acrolein, methacrolein and crotonaldehyde. The organic acids treated include formic, acetic, propionic, butyric, fumaric and maleic acids; vinylacetylene and a variety of miscellaneous compounds were present. The ratio of BOD to MLVSS was approximately 0.24, and retention time averaged 5 days. The purified effluent showed 11 milligrams per liter BOD or a removal of BOD of 99 percent, and pH was changed to 7.9. No foaming or excess odor was evident during the operation.

Example II

The procedure of Example I was repeated except that a waste having BOD of 1701 milligrams per liter and a pH of 3.3 was processed. The ratio of BOD to MLVSS was 0.24 and retention time was 4 days. The purified effluent water contained 31 milligrams per liter of BOD for a percentage of removal of 98 percent and pH was changed to 7.9. No foaming or excess odor was evident during the operation.

Example III

Industrial waste similar to that in Example I, having a BOD of 2,000 milligrams per liter and a pH of 4.2, was fed continuously into the system of FIGURE II. The ratio of BOD to MLVSS was approximately 0.24, and retention time averaged 5 days. The effluent showed 25 milligrams per liter BOD or a removal of BOD of 98+ percent, and pH was changed to 7.3.

Example IV

Industrial waste similar in content to that processed in Example I was processed in the unit of FIGURE II holding the ratio of BOD to MLVSS to 0.41. While the system was viable and operable, a slight foam was present covering 30 to 40 percent of the surface area of the contact zone.

Example V

Industrial waste similar in content to that processed in Example III was treated in the same manner as that of Example III in the unit of FIGURE II, holding the ratio of BOD to MLVSS to 0.50. The system was virtually inoperable due to a heavy build-up of foam which completely covered the surface area of the contact zone.

It will be appreciated by those of skill in the art that the invention has many special features and advantages over prior art processes. For example, it is possible to treat hot waste having volatile components with little or no escape of the volatiles. The invention also makes feasible the treatment of wastes having a high percentage of base or acid content without the necessity of pH adjustment. Moreover, the invention makes possible removal rates of 98 percent or better as compared to 90 percent under the standard process. The process is admirably suited for treatment of industrial wastes having at least 10% by weight non-acidic carbonyl compounds (as herein defined in Example I), exclusive of water content, e.g., 10% to 95%, on a dry weight basis, of non-acidic carbonyl compounds, as well as being useful in treatment of wastes containing 0.001% to 100% (dry weight basis) $C_4$ to $C_{10}$ hydrocarbons, and 0.001% to 50% (dry weight basis) mono and dibasic organic acids containing 2 to 10 carbon atoms.

We claim:

1. In an aerobic waste decomposition process utilizing at least one zone of aeration and agitation, the improvement comprising supplying to a zone of aeration and agitation waste and an activated sludge in a ratio of from 0.15 to 0.41 pound biochemical oxygen demand per pound of mixed liquor volatile suspended solids.

2. A process for aerobic decomposition of waste comprising (1) conveying waste to one or more contact zones having contained therein one or more zones of high aeration and agitation; (2) interspersing the waste in said contact zone with an activated sludge in such proximity to said zone or zones of high aeration that the waste is promptly dispersed through said zone or zones of high aeration to form a waste, activated sludge mixture in a ratio of from 0.15 to 0.41 pound biochemical oxygen demand per pound of mixed liquor volatile suspended solids; (3) retaining and agitating the waste, activated sludge mixture of (2) in the contact zone, including the zone of high aeration and agitation, for a sufficient period of time to allow decomposition of the waste and formation of additional activated sludge; separating a purified effluent water stream from the activated sludge.

3. The process of claim 2 wherein nitrogen containing materials are added to the activated sludge.

4. The process of claim 3 wherein a portion of the activated sludge which is separated from the effluent water stream is recycled to the contact zone.

5. The process of claim 4 wherein a portion of the activated sludge which is separated from the effluent water stream is subjected to anaerobic decomposition.

6. The process of claim 2 wherein the waste treated is an industrial waste and contains a high fraction of volatile organic materials.

7. The process of claim 6 wherein nitrogen containing materials are added to the activated sludge.

8. The process of claim 7 wherein a portion of the activated sludge which is separated from the effluent water stream is recycled to the contact zone.

9. The process of claim 8 wherein a portion of the activated sludge water mixture which is separated from the effluent water stream is subjected to anaerobic decomposition.

References Cited

McKinney, R. E.: Complete Mixing Activated Sludge, Water & Sewage Works, vol. 107, February 1960, pp. 69–73.

McKinney, R. E.: Mathematics of Complete-Mixing Activated Sludge, Journal of the Sanitary Engineering Div., Proc. of the Am. Soc. of Civil Engineers, vol. 88, May 1962, pp. 99–113, pp. 99 and 101 particularly relied on.

MICHAEL E. ROGERS, *Primary Examiner.*